United States Patent Office 2,731,442
Patented Jan. 17, 1956

2,731,442
SULFUR VULCANIZABLE RUBBER STABILIZED WITH A MIXTURE OF AN ALKYL SUBSTITUTED PHENOL AND AN ALKYL SUBSTITUTED DI(HYDROXYPHENYL) ALKANE

Lawrence E. Forman, Akron, Ohio, assignor to The Firestone Tire & Rubber Company, Akron, Ohio, a corporation of Ohio No Drawing. Application September 20, 1952,
Serial No. 310,725

12 Claims. (Cl. 260—45.95)

This invention relates to inhibition of the deterioration of vulcanized rubber compositions. The rubber compositions may be those used in tires, inner tubes, foamed rubber products, rubber thread, and other rubber articles. The compositions consist essentially of natural rubber, the known sulfur-vulcanizable synthetic rubbers, or mixtures of any of these rubbers. When rubber is used or aged under different circumstances, different indications of deterioration appear. The deterioration of rubber is evidenced in different ways and various tests have been devised to determine the effect of different conditions on rubber compositions. Thus, for example, in pneumatic tires, inner tubes and power-transmitting belts the preservation of the tensile strength of the rubber is important.

It is also important to preserve the white or nearly white, color of rubber compositions designed for many uses. Thus, in white-sidewall tires and in foamed-latex mattresses, pillows and upholstery padding, the preservation of the light color of the rubber vulcanizate is desirable. The mixture of inhibitors to which this invention relates preserves the rubber with little or no change in its color.

According to this invention a small amount of an alkyl-substituted phenol and an alkyl-substituted di(hydroxyphenyl)alkane are mixed with the rubber to retard or inhibit deterioration. The two inhibitors may be used in equal amounts, or more of one may be used with less of the other.

The alkyl-substituted phenol may contain several substituents. The total number of carbon atoms in the one or more substituents equals at least four. Thus, this substituted phenol may be tetramethylphenol, sec-butylphenol (either o-, m-, or p-), tert-butylphenol (either o-, m-, or p-), tert-amylphenol (either o-, m-, or p-), sec-amylphenol (either o-, m-, or p-), any dipropylphenol, any dibutylphenol, any diamylphenol, 2-tert-octyl-4-methylphenol, 3-methyl-6-tert-butylphenol, 2-methyl-5-propylphenol, a 4-methyl-6-tert-butylphenol, di-isobutenylphenol, di-isopropenylphenol, any cyclohexylphenols, any dicyclohexylphenols, any mono-, di- or tri-alpha-methylbenzylphenol or any alkylated cresylic acid which contains an average of at least four substituent carbon atoms per phenolic group, etc. The cresylic acid used in preparing the alkylated derivates is preferably a petroleum cresylic acid. The alkylating agent may be a butylating agent, an octylating agent, etc. The number of carbon atoms in the substituents of the alkyl-substituted phenol may equal fifteen or twenty or more, as in trioctylphenol, di-decylphenol, etc.

The other component of the inhibitor is a di(hydroxyphenyl) alkane which has the formula

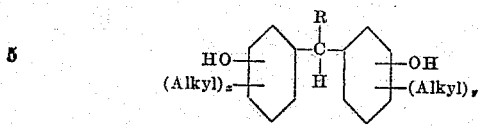

in which x and y are each numbers greater than zero and not larger than 2; the alkyl groups each contain 1 to 16 carbon atoms; the hydroxy-substituted nuclei are selected from the class consisting of 2-hydroxy and 4-hydroxy nuclei; and R is of the group consisting of hydrogen and alkyl groups of 1 to 10 carbon atoms. These compounds are ordinarily prepared by condensing an alkylphenol with an aldehyde. The two phenol nuclei may be the same or different. The substituent groups of the phenol nuclei may be methyl, ethyl, propyl, butyl, amyl, hexyl, heptyl, octyl, nonyl, etc., including straight-chain and branched-chain alkyl substituents up to and including chains of 16 carbon atoms.

The aldehyde may be formaldehyde, parpaform, trioxane, acetaldehyde, paraldehyde, propionaldehyde, a butyraldehyde, a hexaldehyde, a nonaldehyde, benzaldehyde, etc.

The di(hydroxyphenyl)alkanes which may be used include, for example:

Di(2-hydroxy-3,5-dimethylphenyl)methane
Di-1,1-(2-hydroxy-3,5-dimethylphenyl)ethane
Di(2-hydroxy-3-t-butyl-5-methylphenyl)methane
Di-1,1-(2-hydroxy-3-butyl-5-methylphenyl)ethane
Di-1,1-(2-methyl-4-hydroxy-5-butylphenyl)ethane
Di-1,1-(2-methyl-4-hydroxy-5-amylphenyl)ethane
Di(2-methyl-4-hydroxy-5-octylphenyl)methane
Di-1,1-(3-methyl-4-hydroxy-6-methylphenyl)butane
Di-1,1-(2-methyl-4-hydroxy-5-butylphenyl)butane
Di-1,1-(2-hydroxy-3,5-dimethylphenyl)nonane
Di(2-hydroxy-3,5-di-alpha-methylbenzylphenyl)methane In the foregoing formula, butyl is preferably t-butyl, and amyl is preferably t-amyl or sec-amyl. Wherever butyl or amyl is mentioned, octyl may be substituted, and the compounds containing any of these three substituents are preferred.

The alkyl-substituted phenol and the di(hydroxyphenyl) alkane may be mixed before adding to the rubber, or they may be added separately. The two components may be used in equal amounts, or a greater amount of either may be used with less of the other. A small amount of each is used, not exceeding several per cent.

Tests were made with samples containing various compounds. Those samples described as containing octyl-cresylic acid contain material prepared by treating a petroleum cresylic acid with diisobutylene at about 40 to 75° C. in the presence of boron fluoride etherate. Other alkylating catalysts, e. g., sulfuric acid, etc. may be used. The reacted mixture was neutralized, for example, with sodium carbonate solution, and then washed with water. After drying, the alkylated product was distilled to recover compounds boiling above about 140° C. at 10 mm. and therefore containing more than four carbons in alkyl substituents, and to separate these desired materials from lower-boiling compounds which are not alkylated to this extent. The starting material was a petroleum cresylic acid boiling in the range of 195 to 228° C. It was substantially free from phenol, and was composed of cresols, ethylphenols, xylenols, trimethylphenols, tetramethylphenols and higher boiling alkylphenols.

The following data illustrate the invention. Throughout the specification "parts" is used to refer to parts per 100 parts of rubber by weight, and tensile strength is measured in pounds per square inch:

|  | Parts |
|---|---|
| Rubber | 100.0 |
| Zinc oxide | 70.0 |
| Titanium dioxide | 20.0 |
| Blue coloring | 0.2 |
| Wax | 2.0 |
| Stearic acid | 1.2 |
| Sulfur | 3.0 |
| Accelerator | 0.9 |
| Inhibitor | 1.0 |

Five samples were prepared containing inhibitor as follows:

Sample 1.—1.0 part of octylcresylic acid.

Sample 2.—1.0 part of di(3,5-dimethyl-4-hydroxyphenyl)methane which is the condensation product of 2,6-xylenol with formaldehyde.

Sample 3.—1.0 part of di-1,1-(2-methyl-4-hydroxy-5-t-butylphenyl)ethane which is the condensation product of acetylaldehyde as paraldehyde and monobutyl-meta-cresol.

Sample 4.—0.5 part of the octylcresylic acid used in Sample 1 and 0.5 part of the di(hydroxyphenyl)methane used in Sample 2.

Sample 5.—0.5 part of the octylcresylic acid used in Sample 1 and 0.5 part of the di(hydroxyphenyl)methane used in Sample 3.

The samples were cured 60 minutes at 280° F. They were then tested for unaged or normal tensile strength, and reduction in tensile strength on aging 48 hours in a circulating-air oven at 212° F. The per cent tensile strength retained on aging was calculated. These values are recorded in the following table. Oxygen absorption by the various samples was determined as described in the article by J. R. Shelton and Hugh Winn in Industrial and Engineering Chemistry, volume 38, page 71 (1946); ibid., volume 40, page 2081 (1948). By plotting the milliliters of oxygen absorbed per gram of rubber polymer, against the hours required for the absorption, and drawing the slope through the points in the straight line portion of each curve which refers to the constant rate of oxygen absorption, the rates of absorption were obtained and are given in certain of the following tables.

The following table gives the tensile strengths of the various samples, before and after aging 48 hours in an oven at 100° C. It also records the rates of oxygen absorption (slopes) of the various samples.

| Sample No. | 1 | 2 | 3 | 4 | 5 |
|---|---|---|---|---|---|
| Normal tensile | 3,750 | 3,575 | 3,650 | 3,700 | 3,650 |
| Tensile after aging | 1,925 | 2,600 | 2,575 | 2,725 | 2,675 |
| Percent tensile retained | 51.4 | 72.7 | 70.5 | 73.6 | 73.3 |
| Rate of oxygen absorption (slope) | 0.116 | 0.128 | 0.082 | 0.117 | 0.087 |

The mixture of inhibitors gives somewhat better retention of tensile strength on aging, and in both instances the retained tensile for the samples containing the mixed inhibitors was higher than the values for the samples containing a single component. The rate of oxygen absorption for the samples containing the mixed inhibitors was equal to the rate of absorption for the sample containing the single component having the lower rate of absorption, within the limits of experimental error. Such behavior was not predictable. It was not expected.

Another test was made comparing mixed inhibitors of this invention with the octylcresylic acid alone. The foregoing formula was used, with inhibitors as follows:

Sample X.—1.0 part of the octylcresylic acid.

Sample Y.—0.5 part of the octylcresylic acid and 0.5 part of 1,1-di(2-methyl-4-hydroxy-5-t-butylphenyl)ethane.

Sample Z.—0.5 part of nonylcresylic acid (prepared in the same manner as the octylcresylic acid) and 0.5 part of 1,1-di(2-methyl-4-hydroxy-5-t-butylphenyl)ethane.

The several samples were cured 60 minutes at 280° F. The properties of vulcanizates aged in an oven and other vulcanizates aged in oxygen, are compared with unaged vulcanizate in the following table:

|  | Sample X | Sample Y | Sample Z |
|---|---|---|---|
| Unaged properties: |  |  |  |
| 400% Modulus | 850 | 825 | 825 |
| Tensile strength at break | 3,575 | 3,525 | 3,400 |
| Elongation at break percent | 630 | 640 | 630 |
| After aging 2 days in oven at 212° F.: |  |  |  |
| 400% Modulus | 925 | 925 | 900 |
| Tensile strength at break | 2,425 | 2,650 | 2,675 |
| Elongation at break percent | 550 | 570 | 580 |
| Tensile strength retained do | 67.9 | 72.3 | 78.6 |
| Elongation retained do | 87.3 | 89.1 | 92.2 |
| After oxygen absorption: |  |  |  |
| 400% Modulus | 200 | 300 | 750 |
| Tensile strength at break | 320 | 1,050 | 1,755 |
| Elongation at break percent | 320 | 440 | 530 |
| Hours in oxygen | 101 | 125.75 | 100.5 |
| Average tensile loss per hour | 32.2 | 19.7 | 16.5 |
| Oxygen absorption at 90° C.: |  |  |  |
| Hours to absorb 5 ml. oxygen/gm. polymer | 55 | 60 | 58 |
| Hours to absorb 10 ml. oxygen/gm. polymer | 90 | 98 | (a) |
| Total ml. oxygen absorbed/gm. polymer | 11.5 | 14.0 | 8.5 |
| Rate of oxygen absorption (slope) | 0.104 | 0.100 | 0.075 | a 8.5 ml. absorbed in the first 100 hours; estimated that 115 hours would be required to absorb 10 ml. oxygen.

In this test, the inhibitor mixtures of this invention, compared with the composition containing 1.0 part of the octylcresylic acid, showed improved retention of both tensile strength and elongation on aging in an oven, and absorbed less oxygen.

Tests were made in latex. For this purpose the latex was compounded as follows:

*Formula for latex film*

|  | Dry Weight, Parts | Wet Weight, Parts |
|---|---|---|
| Hevea latex | 100.0 | 160.0 |
| KOH | 0.6 | 3.0 |
| Ammonium caseinate | 0.5 | 5.0 |
| Sulfur | 1.5 | 3.0 |
| Zinc oxide | 3.0 | 7.5 |
| Accelerator | 1.0 | 2.0 |
| Inhibitor | 1.0 | 2.5 |
| Distilled water |  | 5.8 |

Samples were prepared containing inhibitors as follows:

Sample 6.—1.0 part of the octylcresylic acid.

Sample 7.—1.0 part of 1,1-di(2-methyl-4-hydroxy-5-t-butylphenyl)ethane.

Sample 8.—0.5 part of the octylcresylic acid and 0.5 part of the di(hydroxyphenyl)methane used in Sample 7.

Films were spread from the several latices and cured one hour at 100° C. These samples were then tested for loss of tensile strength on aging, and the results are recorded in the following table:

| Sample No. | 6 | 7 | 8 |
|---|---|---|---|
| Unaged tensile strength | 5,600 | 4,400 | 4,735 |
| After aging 24 hours at 100° C | 1,350 | 2,600 | 2,625 |
| Percent tensile retained | 24 | 59 | 56 |
| After aging 7 days at 70° C | 3,760 | 4,310 | 4,575 |
| Percent tensile retained | 67 | 98 | 97 |
| After aging 21 days at 70° C | 1,750 | 2,925 | 3,075 |
| Percent tensile retained | 31 | 67 | 65 |

Other tested films contained inhibitors as follows:

Sample A.—1.5 parts of the octylcresylic acid.
Sample B.—1.0 part of the octylcresylic acid and 0.5 part of the di(hydroxyphenyl)methane of Sample 7.

In the following table tensile data on all five films is given. The compositions of the respective films are given in the table, using OCA to represent the octylcresylic acid and DHM to represent the di(hydroxyphenyl)methane.

| Sample | 6 | A | 7 | 8 | B |
|---|---|---|---|---|---|
| Parts of OCA | 1.0 | 1.5 | | 0.5 | 1.0 |
| Parts of DHM | | | 1.0 | 0.5 | 0.5 |
| Unaged tensile | 5,600 | 4,600 | 4,400 | 4,735 | 4,500 |
| Aged tensile | 1,350 | 995 | 2,600 | 2,625 | 3,000 |
| Percent Tensile retained | 24 | 22 | 59 | 56 | 67 |

The poorest aged tensile and per cent tensile retained is recorded for the samples containing only the octylcresylic acid (Samples 6 and A). The samples containing the mixed inhibitor (Samples 8 and B) show that half quantities of the two components gave protection substantially equal to that obtained with one part of the di(hydroxyphenyl)methane, alone, and an additional amount of the octylcresylic acid (Sample B) materially improved protection.

An aging test was made on foamed latex prepared from latex of the following formula:

|  | Dry Weight, Parts | Wet Weight, Parts |
|---|---|---|
| Hevea latex | 100.0 | 160.0 |
| Sulfur | 2.0 | 4.0 |
| Potassium oleate | 2.0 | 10.0 |
| Accelerator | 2.5 | 5.5 |
| Sensitizer | 0.5–1.0 | 1.0–2.0 |
| Zinc oxide | 5.0 | 12.5 |
| Sodium silico fluoride | 0.5–1.5 | 1–3 |
| Inhibitor | 1.0 | 2.5 |

Distilled water was added in the amount necessary to bring the total solids content to 57 per cent. Three samples were prepared which contained the following inhibitors:

Sample 9.—1.0 part of the octylcresylic acid.
Sample 10.—1.0 part of 1,1-di(2-methyl-4-hydroxy-5-t-butylphenyl)ethane.
Sample 11.—0.5 part of the octylcresylic acid and 0.5 part of the di(hydroxyphenyl)methane used in Sample 10.

The samples were beaten to a foam and vulcanized for 45 minutes at 100° C. in open steam. The samples were then exposed to a General Electric sunlamp for 10 hours at seven inches. Various other good inhibitors were tested at the same time and of all those tested, including those listed above, Sample 11 had the best discoloration rating. Samples 9 and 10 were not as good as Sample 11 from the standpoint of discoloration.

When subjected to natural light, Sample 10 was much inferior to Samples 9 and 11 which were both superior in respect to freedom from discoloration. The mixture of half a part of the octylcresylic acid, mixed with half a part of the di(hydroxyphenyl)methane, gave discoloration results equal to one part of octylcresylic acid inhibitor and was superior to the one part of octylcresylic acid in other properties.

When exposed to sunlight behind glass for a prolonged time, there was no substantial evidence of flaking or resinification of the foamed latex of Samples 9 and 11. Sample 10 was noticeably inferior. The mixture of half a part, each, of the inhibitors gave results equal to one part of the octylcresylic acid, while remaining superior to the one part of octylcresylic acid in other properties.

When samples of these three foamed latices were heated at 150° C. in a circulating-air oven. Sample 9 melted down or collapsed first. Samples 10 and 11 withstood the test equally well. The mixture of half a part, each, of the two inhibitors withstood the test as well as the one part of di(hydroxyphenyl)methane alone, and was superior to the latter for other properties.

The above tests indicate situations in which the mixture of chemicals will inhibit deterioration of rubber articles prepared from latex much better than either ingredient of the mixture, used alone.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. cyclohexyl benzothiazole sulfenamide, thiazoline sulfenamides, thiocarbamyl sulfenamides, mercaptothiazoles, mercaptothiazolines, thiazolyl mono- and di-sulfides, the dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned where desired, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butyl xanthate, zinc ethyl xanthate, zinc salt of mercaptobenzothiazole, zinc dimethyl dithiocarbamate, and zinc dibutyl dithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What I claim is:

1. A sulfur-vulcanized rubber composition which includes as an inhibitor of deterioration a small amount of alkyl-substituted phenol and a small amount of di(hydroxyphenyl)alkane; which alkyl-substituted phenol contains at least one substituent and a total of at least four substituent carbon atoms; and which di(hydroxyphenyl)alkane has the formula

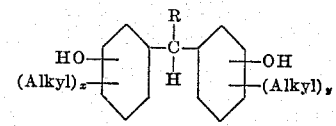

in which $x$ and $y$ are each numbers greater than zero and not larger than 2; the alkyl groups each contain one to sixteen carbon atoms; the hydroxy-substituted nuclei are selected from the class consisting of 2-hydroxy and 4-hydroxy nuclei; and R is of the group consisting of hydrogen and alkyl groups of one to ten carbon atoms.

2. The rubber composition of claim 1 in which the alkyl-substituted phenol is petroleum cresylic acid alkylated to contain an average of at least four substituent carbon atoms per phenolic group.

3. The rubber composition of claim 1 in which the di(hydroxyphenyl)alkane is 1,1-di(2-methyl-4-hydroxy-5-t-butylphenyl)ethane.

4. The rubber composition of claim 1 in which the di(hydroxyphenyl)alkane is di(3,5-dimethyl-4-hydroxyphenyl)methane.

5. The rubber composition of claim 1 in which the di(hydroxyphenyl)alkane is di(2-hydroxy-3-t-butyl-5-methylphenyl)methane.

6. The rubber composition of claim 1 in which the di(hydroxyphenyl)methane is 1,1-di(2-methyl-4-hydroxy-5-t-butylphenyl)butane.

7. The process of sulfur-vulcanizing rubber in the presence of a small amount of alkyl-substituted phenol and a small amount of di(hydroxyphenyl)alkane, as inhibitors of deterioration; which alkyl-substituted phenol contains at least one substituent and a total of at least four substituent carbon atoms; and which di(hydroxphenyl)alkane has the formula

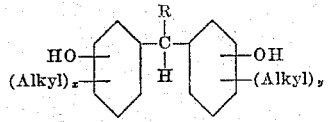

in which $x$ and $y$ are numbers greater than zero and not larger than 2; the alkyl groups each contain one to sixteen carbon atoms; the hydroxy-substituted nuclei are selected from the class consisting of 2-hydroxy and 4-hydroxy nuclei; and R is of the group consisting of hydrogen and alkyl groups of one to ten carbon atoms.

8. The process of claim 7 in which the alkyl-substituted phenol is petroleum cresylic acid alkylated to contain an average of at least four substituent carbon atoms per phenolic group.

9. The process of claim 7 in which the di(hydroxyphenyl)alkane is 1,1-di(2-methyl-4-hydroxy-5-t-butylphenyl)ethane.

10. The process of claim 7 in which the di(hydroxyphenyl)alkane is di(3,5-dimethyl-4-hydroxyphenyl)methane.

11. The process of claim 7 in which the di(hydroxyphenyl)alkane is di(2-hydroxy-3-t-butyl-5-methylphenyl)methane.

12. The process of claim 7 in which the di(hydroxyphenyl)alkane is 1,1-di(2-methyl-4-hydroxy-5-t-butylphenyl)butane.

References Cited in the file of this patent

UNITED STATES PATENTS

| | | |
|---|---|---|
| 1,989,788 | Calcott et al. | Feb. 5, 1935 |
| 2,295,985 | Baird et al. | Sept. 5, 1942 |
| 2,356,929 | Hart | Aug. 29, 1944 |
| 2,581,906 | Smith | Jan. 8, 1952 |

FOREIGN PATENTS

| | | |
|---|---|---|
| 413,012 | Great Britain | July 12, 1934 |